United States Patent Office 3,448,175
Patented June 3, 1969

3,448,175
PROCESS OF POLYMERIZING STYRENE AND ACRYLONITRILE WITH A DIOLEFIN RUBBER
Kenneth W. Doak and Frederick E. Carrock, Wyckoff, N.J., assignors to Dart Industries Inc., Los Angeles, Calif., a corporation of Delaware
No Drawing. Filed Aug. 16, 1963, Ser. No. 302,716
Int. Cl. C08f *19/02, 19/00*
U.S. Cl. 260—880                                    6 Claims

ABSTRACT OF THE DISCLOSURE

A process is disclosed for copolymerization of a monovinyl aromatic hydrocarbon such as styrene and acrylonitrile with a rubbery polymer which comprises dissolving the rubber in the monomeric mixture wherein the aromatic hydrocarbon and acrylonitrile are in a weight ratio of 40/60 to 60/40, partially polymerizing to a conversion of 10 to 45% and completing polymerization in aqueous suspension. To insure that the final product has an overall weight ratio of aromatic hydrocarbon to acrylonitrile of 60/40 to 74/26, at least one portion of the aromatic monomer is added during the polymerization. Preferably, one portion is added during the bulk prepolymerization and another portion during suspension polymerization.

---

This invention relates to an improved process for the preparation of terpolymers of acrylonitrile, styrene and rubber and more specifically to a process for preparing terpolymers containing a rubber phase dispersed in a resin phase matrix. The invention is particularly concerned with a novel method of introducing the styrene or its equivalent component into the reaction mixture as well as the preparation of a novel terpolymer product having outstanding chemical and physical properties. The notation terpolymers, as used throughout this specification and the appended claims, includes polymer compositions resulting from the polymerization of acrylonitrile, styrene (alpha methyl styrene can be used in minor amounts in partial substitution of styrene) and rubber, the latter being composed of one or more polymerized monomers (homo or copolymer rubbers).

A recently developed process for preparing such terpolymers comprises the steps of dissolving a rubbery polymer in a mixture of styrene and/or equivalents and acrylonitrile, prepolymerizing the resulting mixture in bulk to from about 10 to 45% conversion, and preferably from about 15 to 30% conversion, and then suspending the prepolymer reaction product mixture in an aqueous suspension and polymerizing the resulting mixture to completion to obtain the terpolymer product in the form of beads.

Terpolymers prepared from compounds of acrylonitrile and styrene and/or equivalents grafted onto a rubbery polymer have enhanced physical and chemical properties with respect to ambient and low temperatures, weather and heat resistance and mechanical strength and are useful, therefore, in the preparation of a variety of plastic products by well known plastic processing techniques. The terpolymer products obtained by the above described process, often referred to hereinafter as the two step polymerization process or technique, has the further advanage of yielding uniform sized polymer beads of narrow size distribution.

In general, all of the terpolymer polymerization processes heretofore proposed, including the two step polymerization process discussed above, have employed a parts by weight ratio of styrene and acrylonitrile of about 75/25. This particular mixture of components was used because it corresponds to the azeotropic composition, i.e. the ratio of monomers employed is equivalent to that entering into the copolymer throughout the entire polymerization. Recently it has been found desirable to increase the acrylonitrile content of the resin copolymer from 25 to preferably about 30%. As described more fully hereinafter, this increase in the acrylonitrile content results in marked improvements in the physical and chemical characteristics of the terpolymer product. It has been found, for example, that increased chemical and solvent resistance is exhibited when the acrylonitrile content of the styrene-acrylonitrile mixture is increased within the range of from 26 to 40%. It will be understood that the ultimate percent of acrylonitrile in the terpolymer product will depend on the type and amount of rubber employed and other additives present in addition to the degree of conversion of the monomers. The overall ratio of styrene to acrylonitrile in the final product will, however, be within the range of from 74/26 to 60/40. This overall ratio of styrene to acrylonitrile refers to the polymerizable monomer mixture employed in preparation of the terpolymers of this invention.

Unfortunately, the mere use of additional amounts of acrylonitrile in the feed mixture has not been found to be successful for obtaining a satisfactory terpolymer product having about 60/40 to 70/30, the preferred ratios, of styrene to acrylonitrile. For one thing, in the final stages of the polymerization, the polymer formed contained substantially all acrylonitrile, thereby resulting in a heterogeneous product. The polymer thus formed had a very distinctive yellow color due to the abnormally high content of acrylonitrile in the copolymer.

One object of the present invention is to provide a process whereby a terpolymer product can be readily prepared by using styrene/acrylonitrile mixtures ranging from about 60/40 to 74/26 on a weight basis.

Another object of this invention is to provide an improved process for polymerizing acrylonitrile and styrene with a rubbery material, under controlled styrene addition conditions, to obtain an outstanding terpolymer product.

A further object of this invention is to provide an improvement in the two step polymerization process to attain an overall ratio of styrene to acrylonitrile of from about 60/40 to 74/26, but preferably 60/40 to 70/30 in the terpolymer product.

A still further object of the invention is to provide an improved two step polymerization process for the preparation of a novel terpolymer product having outstanding chemical and physical characteristics.

These and other objects of the invention will become apparent from the ensuing description and illustrative embodiments.

In accordance with the present invention, it has been found that the two step polymerization process described in detail below can be modified with respect to the addition of styrene to the polymerization mixtures so as to result in the formation of a terpolymer product having an overall final ratio of styrene to acrylonitrile of about 60/40 to 74/26, but preferably 60/40 to 70/30 and with highly desirable terpolymer properties. This is accomplished, in general, by utilizing an initial feed mixture containing a styrene to acrylonitrile ratio of about 40/60 to 60/40. Thus, in order to prepare a homogeneous 70/30 copolymer of styrene to acrylonitrile, the initial feed mixture would contain a 56/44 ratio of styrene and acrylonitrile. Prior to reaching 35 percent conversion and preferably after 20 percent conversion is attained, a first incremental addition of styrene is made. If only one incremental addition is to be made, then a sufficient amount of styrene is added at the point indicated above to adjust the overall styrene to acrylonitrile ratio to 70/30. However, to obtain a more homogeneous product which is substantially completely free of yellow color and has improved solvent resistance to hydrocarbons such as gasoline, more than one incremental addition is preferred, for example, one-half the amount of styrene required for the aforestated adjustment at the point indicated above and the other half during the suspension polymerization step. Similarly, to prepare a homogeneous 60/40 copolymer of styrene is acrylonitrile, a 45/55 initial feed mixture of these two monomers is employed and the amount of styrene required to make the overall comonomer ratio equal to 60/40 is added incrementally in one or more additions as outlined above. For 26 to 29 percent acrylonitrile, the initial feed can consist of from 60/40 to 55/45 of styrene to acrylonitrile.

Preferably, the styrene addition should be made in at least two increments, with at least one addition of styrene during the suspension polymerization step to insure the preparation of an outstanding terpolymer product capable of being employed in numerous commercial applications. Another important advantage of incremental addition of the styrene is the preparation of a more homogeneous terpolymer product of outstanding color, that is, substantial absence of yellow color and increased solvent resistance to hydrocarbons.

The present invention will, however, be more fully understood by the following description of the materials and the operating conditions.

As the rubber phase, there can be employed, according to the process of this invention, rubbery systems such as butadiene-acrylonitrile copolymer (nitrile rubber) containing from 10 to 30% acrylonitrile, polybutadiene rubbers, whether of the linear or non-linear type (emulsion polymerization of butadiene results in a non-linear polymer), polyisoprene, polycyclopentadiene, natural rubber, chlorinated rubber, copolymers of butadiene with styrene, both linear and non-linear, copolymers of butadiene with isobutylene and mixtures thereof. The homopolymers of isoprene can be of the linear or non-linear type. SBR type or linear (solution polymerized with stereospecific catalysts) rubbers can contain from 5 to 50% by weight of styrene to 50 to 95% by weight of butadiene, a specific type containing about 25% styrene and 75% butadiene by weight.

A preferred rubbery component, according to this invention, is a linear polybutadiene (polymerized by 1,4 addition) having a cis content of about 30 to 98%, preferably 35 to 60%. The terpolymers obtained when the preferred linear polybutadiene is used yield resins of excellent color, gloss and high impact strengths, particularly at low temperatures. By excellent color, it is understood that the polymer is relatively free of the yellow color which is usually characteristic of polymers containing very large amounts of acrylonitrile. The cause for the lack of yellowing in these polymers is not completely understood; however, the use of linear polybutadienes in the process herein does produce such polymers, which also develop a high surface gloss when molded. It was further found that in the absence of rubber, the styrene-acrylonitrile copolymers are yellow in color.

Butadiene (or isoprene) polymerized by cis-1,4 addition exists in a rubbery form at ambient temperatures. The cis-1,4 form can be produced either by lithium metal or lithium alkyls or a Ziegler type catalyst system, as is well known in the art. These methods of polymerization yield linear polymers in contradistinction to a largely non-linear polymer obtained by well known emulsion polymerization recipes. The preferred cis-polybutadiene which can be employed in the compositions of this invention will have a viscosity between 30 to 90, preferably about 40 to 60, as measured on the Mooney viscometer at 212° F. (ML-4) (ASTM D-927-55T).

A critical component of the terpolymer resins is acrylonitrile. In the instance of styrene, however, substantial equivalents of this monomer can be incorporated in full or in part in the polymerization system. For example, part of the styrene can be substituted with other monovinyl aromatics, e.g. alpha-methylstyrene up to 50% by weight, to impart certain properties to the polymer, such as improved heat resistance and flow properties. Vinyl aromatics other than styrene can also be used, at least in part, or substituted fully for the styrene monomer, for example those compounds having the aromatic nucleus substituted with one or more groups, such as methyl, ethyl or chloro groups illustrated by such monomers as vinyltoluene, vinylxylene, vinylethylbenzene and vinylchlorobenzene or mixtures of these, including minor amounts of alpha-methylstyrene.

The acrylonitrile in the comonomer mixture is present in a ratio from about 40 to 60 parts by weight of acrylonitrile to about 60 to 40 parts by weight of styrene in accordance with the method of this invention.

In practicing the improved process of this invention, to styrene and acrylonitrile in a vessel equipped with a stirrer, there is added preferably finely ground monomersoluble rubbery polymer in an amount of from 4 to 15 weight percent. To the solution of styrene, acrylonitrile and rubbery material there can also be added antioxidants, chain regulators, lubricants and inert fillers. If desired, as an antioxidant, the conventional phenolic types, as well as alkyl aryl phosphites, for example, 2,6-ditertiary-butyl-4-methylphenol, trisnonylphenyl phosphite, can be used in amounts of from about 0.01 to 1.0 percent by weight. Mercaptans such as tertiary dodecyl mercaptan, can be added in amounts of from 0.01 to 0.2 weight percent for the purpose of controlling polymer chain length. Lubricants which can be incorporated in the solution are such as refined mineral oils, paraffin wax or mixtures with mineral oils and hydrocarbon oil or ester lubricants, such as butyl stearate in amounts of from 1 to 4 weight percent. Mineral oil (e.g. white mineral oil) has been found to increase impact values when used in certain specified amounts, for example, when used in amounts of at least 2%. A preferred mineral oil is one of a saturated aliphatic nature boiling at from 250° to 500° C. and of a centistoke viscosity of from 5 to 100 at 100° F.

The acrylonitrile can be added to the styrene prior to the addition of rubber or after, the addition of this component not being critical at any specific step prior to the prepolymerization reaction.

After the addition of the acryonitrile to the styrene and the dissolution of the rubbery polymer, polymerization in bulk is commenced using a peroxide initiator of the oil soluble type or thermally and polymerization is continued at a temperature as follows: for thermal initiation, the temperature can range from 90° to 120° C., preferably 100° to 115° C.; for peroxide initiation, the temperature can range from 60° to 100° C., preferably from 75° to 90° C. The polymerization is continued until from about 10 to 45%, about 15 to 30% in the preferred embodiment, of the monomers are polymerized in the mixture. The prepolymerization step generally takes from about 2 to 4 hours. A peroxide initiator, such as benzoyl peroxide, lauroyl peroxide, tertiary butyl peracetate, tertiary butyl perbenzoate, ditertiary butyl peroxide, cyclohexanone peroxide, etc., can be used in amounts of from 0.05 to 0.2%, preferably 0.075 to 0.15%, by weight based on the mixture. The use of cyclohexanone peroxide as the catalyst constitutes the preferred method of practicing the present process for peroxide initiation. However, in general, thermal prepolymerization is the preferred method.

During the prepolymerization, the components of the system are thoroughly agitated. Agitation is required to properly disperse rubber as it comes out of solution during the prepolymerization step. In the process of this invention it is preferred to make at least one incremental styrene addition after 20 percent conversion and this is accomplished without interruption of the prepolymerization step.

Upon completion of the prepolymerization step to the desired conversion, the mixture is suspended in an aqueous system containing suspension stabilizers and polymerization continued to essential completion to form beads of high impact material. An incremental addition of styrene can be made before or after the prepolymer is suspended. An initiator is preferably added to the suspension to substantially complete the polymerization. It is preferable to use a thermal prepolymerization step, followed by the addition of an initiator to the suspension polymerization step. It is possible, however, to use an initiator for prepolymerization, or to include initially two initiators in the prepolymerization step, such as a low temperature initiator for prepolymerization and a high temperature one for the subsequent suspension step. A suitable initiator which can be used during the suspension polymerization is an organic peroxide such as benzoyl peroxide, caproyl peroxide, lauroyl peroxide, tertiary butyl perbenzoate, dicumyl peroxide, tertiary butyl peracetate, tertiary butyl peroxide, and mixtures thereof. A suspension polymerization initiator is usually required to shorten the overall polymeriztaion time-temperature cycle. The process of this invention does not exclude, however, thermal polymerization in the second or suspension step, since it has been found to give adequate results.

The preferred initiators for use during the suspension step have been found to be tertiary butyl perbenzoate and those initiators having a half-life similar to this initiator, for example, tertiary butyl peracetate, dicumyl peroxide and cyclohexanone peroxide. Excellent results are obtained by way of polymer properties when the preferred initiator(s) are used during suspension, as well as the other conditions specified herein.

The amount of suspension step initiator, when this is used, is based on the weight of the prepolymer and the level used is from about 0.05 to 0.3% by weight when a particular initiator is used alone, or from 0.1 to 0.4% by weight when a combination of each is employed for both polymerization steps. Preferred levels are about 0.1 to 0.2% by weight for a single initiator and 0.075 to 0.15% by weight for each of a combination of initiators.

The prepolymer, before or after the addition of a suspension step peroxide initiator, is suspended in an aqueous solution containing a suspending agent, and polymerization is continued at time-temperature cycles to be set forth hereinbelow until the monomer is substantially completely polymerized into uniform sized granules or beads. Suspending agents such as carboxymethylcellulose, polyvinyl alcohol, methylcellulose, sulfonated polystyrenes, polyglycol ethers, etc., can be used.

An excellent suspending agent has recently been found to be a water soluble non-ionic colloid of high viscosity in an aqueous solution. Hydroxyethyl cellulose is of particular interest since it yields optimum polymerization results. The use of this suspending agent results in non-agglomeration of the polymer beads, minimum water occlusion in the beads and beads having a narrow size distribution. Hydroxyethyl cellulose of a viscosity in a 1% aqueous solution at 25° C. of from 750 to 10,000 cps. (Brookfield viscometer) is adequate. A preferred viscosity range, however, for a 1% aqueous solution of hydroxyethyl cellulose is from 1500 to 3500 cps. (Brookfield viscometer) at 25° C. The hydroxyethyl cellulose preferred, according to this invention, is readily available commercially and is soluble in hot or cold water. For further information on the properties of hydroxyethyl cellulose, see Brownell, H. H. et al. "Canadian Journal of Chemistry" 35, 677 (1957) and Cohan, S. G. et al. "Journal American Chemical Society" 72, 3954 (1950).

In preparing the aqueous suspension, the hydroxyethyl cellulose is sifted into the water slowly and with rapid stirring to avoid the formation of agglomerates. If desired, a surface active agent such as sodium dodecyl benzensulfonate can also be included in the suspension water in an amount of from 0.001 to 0.01 weight percent based on the water.

The amount of hydroxyethyl cellulose used is from about 0.025 to 1.5 weight percent and preferably in an amount of from 0.075 to 0.35 weight percent based on the water. Any dissolved oxygen or oxygen in the atmosphere immediately above the suspension is displaced by the use of nitrogen.

The prepolymer is added to the suspension, preferably in the vicinity of the agitator blade or vanes, so as to facilitate the formation and dispersion of polymer beads. The prepolymer is added in an amount such that the ratio of prepolymer to water is generally from about 1/2 to 5/4 with best results being obtained with a prepolymer to water ratio of 1/4 to 3/4. These prepolymer to water ratios, as can be seen, contribute unique advantages to a process of this type. In prior art techniques using other well known suspending agents, larger amounts of water were required.

The temperature of the suspension is gradually increased from, for example, room temperature or higher, such as 80° C. up to about 135° C. and can, under suitable conditions, be increased up to 150° C., after which period non-agglomerated, uniform sized, high impact, thermoplastic polymer beads of uniform hue are formed in suspension. The time-temperature cycle best suited for completion of the present polymerization process after transferring the bulk prepolymer to the aqueous system is generally from about 90° to 145° C. for a period of about 5 to 12 hours. Excellent results are obtained when the suspension is maintained at a temperature of from 100° to 110° C. for 2 to 4 hours, then 115° to 125° C. for 1 to 2 hours and finally from 130° to 145° C. for 1 to 2 hours.

In accordance with the most important aspect of the present invention, the styrene to acrylonitrile ratio was adjusted to that desired for the final product following the prepolymerization step by adding additional styrene to the reaction product mixture. Although all of the styrene required to adjust the aforementioned ratio within the range of about 74/26 to 60/40 can be added all at once just prior to the suspension polymerization step, it was found especially effective to unseat least one incremental styrene addition during the course of the suspension polymerization. In actual operations, it was discovered that the use of incremental styrene addition resulted in terpolymer products which were whiter in color than those obtained either when a single styrene addition was made just prior to the suspension step or when the initial feed mixture to the prepolymerization step contained a parts by weight ratio of 70 styrene to 30 acrylonitrile. Moreover, when more than one incremental styrene addition is made, the solvent resistance of the terpolymer to hydrocarbons increases (as compared to one incremental addition). In fact, one of the essential features of the present invention is to employ at least one addition of styrene during suspension polymerization. One of the preferred methods of operation comprises the use of several incremental styrene additions such as, for example, adding one half of the required styrene after 20 percent conversion of the monomers, but prior to the suspension step, with the remainder added after about one hour of polymerization time has elapsed in the suspension step. It is also possible to employ three incremental styrene additions. This can be accomplished, for example, by adding equal amounts of styrene (1) after 20 percent conversion of the monomers but prior to suspension, (2) after about one hour of suspension polymerization and (3) after two hours of suspension polymerization. It will be understood, furthermore, that the final addition of styrene will always be sufficient to give the desired final sytrene to acrylonitrile ratio.

The following examples further illustrate the invention. In general, the procedure employed in the examples was as follows.

Finely ground, monomer soluble, rubbery polymer was dissolved in a monomer blend of styrene and acrylonitrile at a parts by weight ratio of 50/50 to 56/44. The monomer solution was added to a round bottom flask equipped with a condenser and stirrer and while the solution was being agitated, cyclohexanone peroxide was added thereto and additives, such as chain transfer agents, antioxidants and lubricants. The flask and its contents were thoroughly flushed with nitrogen and a nitrogen blanket was maintained over the solution. The agitated solution was heated to and maintained at the reflux temperature of acrylonitrile until the monomers were partially polymerized, whereby a prepolymer was prepared. In cases where the prepolymerization temperature was above the boiling point of the monomer mixture, the polymerization was carried out under pressure.

An aqueous suspension was prepared by dissolving hydroxyethyl cellulose having a viscosity in a 1% aqueous solution at 25° C. from about 1500 to 2500 cps. (Brookfield viscometer) in a glass bowl pressure reactor equipped with stirrer.

The prepolymer was added with a portion of the additional required styrene to the aqueous suspension at a moderate rate while the suspension was maintained under constant agitation. The reactor and its contents were flushed with nitrogen and the reactor was seated and pressurized with 5 to 20 p.s.i. nitrogen. Polymerization was continued with agitation at a temperature cycle of 3 hours at 115° C., during which time the desired incremental styrene additions were made and then 1 hour at 125° and 1 hour at 135° C. Upon completion of the polymerization, the mixture was cooled, the reactor opened and the contents filtered to isolate the beads. The beads were washed with water and dried in a vacuum oven at 65° C. Physical properties were measured on compression-molded samples.

In the following example, the weight of the rubbery component, mineral oil and trisnonylphenyl phosphite (Polygard) was based upon 100 parts by weight of the polymer product; the weight of the cyclohexanone peroxide high temperature initiator and the eight of the t-dodecyl mercaptan were based upon 100 parts by weight of the mixture undergoing prepolymerization; the weight of hydroxyethyl cellulose in the aqueous suspension was based upon the weight of the water; while the weight of the suspension polymerization initiator was based on the amount of the prepolymer suspended in water.

EXAMPLE I

The runs of this example illustrate that excellent terpolymer products can be achieved by utilizing the incremental styrene feed method of this invention to prepare terpolymers having an overall ratio of styrene to acrylonitrile of 70/30. The specific method of styrene addition and the overall adjusted ratio of styrene to acrylonitrile will be indicated for each run along with the operating materials and conditions. The polymerization method employed is the two step bulk suspension process described above. Tertiary butyl perbenzoate, one of the preferred suspension step initiators, was also used during this step.

TABLE A

| Ingredients | Parts by Weight | | | | | | | |
|---|---|---|---|---|---|---|---|---|
| | A | B | C | D | E | F | G | H |
| Polymerization Step: | | | | | | | | |
| Styrene | 75 | 56 | 50 | 56 | 56 | 56 | 56 | 70 |
| Acrylonitrile | 25 | 44 | 50 | 44 | 44 | 44 | 44 | 30 |
| Rubber [1] | 6 | 6 | 6 | 6 | 6 | 8 | 8 | 8 |
| Mineral Oil | 3 | 3 | 3 | 3 | 3 | 3 | 3 | 3 |
| Trisnonylphenyl Phosphite | 0.5 | 0.5 | 0.5 | 0.5 | 0.5 | 0.5 | 0.5 | 0.5 |
| Cyclohexanone Peroxide | 0.2 | 0.2 | 0.2 | 0.2 | 0.2 | 0.2 | 0.2 | 0.25 |
| t-Dodecyl Mercaptan | 0.1 | 0.1 | 0.1 | 0.1 | 0.1 | 0.1 | 0.1 | 0.1 |
| Polymerization Temp., °C | 90 | 88 | 85 | 85 | 85 | 85 | 85 | 85 |
| Total Solids, percent | 25 | 24 | 19 | 30 | 30 | 30 | 30 | 30 |
| Adjusted S/A Ratio | | [4] 70/30 | [4] 70/30 | [4] 70/30 | [5] 70/30 | [6] 70/30 | [5] 70/30 | |
| Suspension Step: | | | | | | | | |
| Prepolymer | 100 | 100 | 100 | 100 | 100 | 100 | 100 | 100 |
| Water | 130 | 165 | 165 | 165 | 165 | 165 | 165 | 165 |
| Hydroxyethyl Cellulose | 0.35 | 0.4 | 0.4 | 0.4 | 0.4 | 0.4 | 0.4 | 0.4 |
| t-Butyl Perbenzoate | 0.1 | 0.1 | 0.1 | 0.2 | 0.2 | 0.2 | 0.2 | 0.2 |
| Physical Properties: | | | | | | | | |
| Izod Impact [2] (compression molded) | 1.8 | 3.3 | 3.6 | 1.7 | 2.5 | 2.9 | 3.5 | 3.5 |
| Melt Flow at 190° C.[3] (grams/10 minutes) | 0.1 | 0.1 | 0.1 | 0.1 | 0.1 | 0.1 | 0.1 | 0.1 |
| Color | White | White | White | White | White | White | White | Yellow |
| Bead Size | Medium | Medium | Medium | Medium | Medium | Medium | Medium | Medium |

[1] Linear polybutadiene having a 35% cis-1,4 content (Mooney viscosity=55).
[2] ASTM D-256-56.
[3] ASTM-1238-57T.
[4] All of additional styrene added just prior to the suspension polymerization step.
[5] Equal amounts of additional styrene were added just prior to suspension, after heating 1 hour at 115° C., and after heating for 2 hours at 115° C.
[6] One half of additional styrene added just prior to the suspension polymerization step, and the remainder added after 1 hour at 115° C.

From the foregoing Table A, several observations are worthy of comment. Thus, all terpolymers prepared in Runs A to G were white in color. Run H, which illustrates an attempt to prepare white polymer by initiating the polymerization with a feed mixture of styrene to acrylonitrile ratio of 70/30, that is, where no incremental addition(s) was performed, resulted in a yellow colored polymer which is typical of prior art polymers prepared by this technique of polymerization. The table also demonstrates that various styrene to acrylonitrile ratios can be used in the feed mixture and that by properly adjusting the ratio by incremental addition, the desired overall ratio of 70/30 can be obtained. The table further illustrates one and two or three incremental styrene additions at various points as heretofore described. Note also that in the majority of runs only 6% of rubber was used.

EXAMPLE II

Another series of runs demonstrating the practice of this invention were carried out similarly to Example I with the exception that thermal prepolymerization was employed with other modifications shown in the following Table B.

TABLE B

| Ingredients | A | B | C | D | E | F | G | H |
|---|---|---|---|---|---|---|---|---|
| Prepolymerization Step: | | | | | | | | |
| Styrene | 56 | 56 | 56 | 56 | 56 | 56 | [7] 56 | 70 |
| Acrylonitrile | 44 | 44 | 44 | 44 | 44 | 44 | 44 | 30 |
| Rubber [1] | 8 | 8 | 8 | 8 | 8 | 8 | 8 | 8 |
| Mineral Oil | 3 | 3 | 3 | 2 | 2 | 2 | 3 | 3 |
| Trisnonylphenyl Phosphite | 0.5 | 0.5 | 0.5 | 0.5 | 0.5 | 0.5 | 0.5 | 0.5 |
| t-Dodecyl Mercaptan | 0.1 | 0.1 | 0.1 | 0.1 | 0.1 | 0.1 | 0.1 | 0.1 |
| Polymerization Temp., °C | 110 | 110 | 110 | 105 | 105 | 105 | 110 | 110 |
| Total Solids, percent | 30 | 30 | 30 | 29 | 29 | 29 | 26 | 30 |
| Adjusted S/A Ratio | [4] 70/30 | [5] 70/30 | [6] 70/30 | [4] 67/33 | [5] 67/33 | [5] 67/33 | [8] 70/30 | |
| Suspension Step: | | | | | | | | |
| Prepolymer | 100 | 100 | 100 | 100 | 100 | 100 | 100 | 100 |
| Water | 165 | 165 | 165 | 165 | 165 | 165 | 165 | 165 |
| Hydroxyethyl Cellulose | 0.4 | 0.4 | 0.4 | 0.33 | 0.33 | 0.33 | 0.33 | 0.4 |
| t-Butyl Perbenzoate | 0.2 | 0.1 | 0.2 | 0.1 | 0.1 | 0.1 | 0.1 | 0.2 |
| Physical Properties: | | | | | | | | |
| Izod Impact [2] | 4.2 | 3.3 | 4.1 | 3.3 | 2.3 | 2.4 | 2.8 | 3.0 |
| Melt Flow [3] | 0.1 | 0.1 | 0.1 | 0.1 | 0.1 | 0.1 | 0.2 | 0.1 |
| Color | Sly. Yellow | White | White | Sly. Yellow | White | White | White | Yellow |
| Bead Size | Fine | Fine | Fine | Medium | Medium | Medium | Medium | Medium |

[1] Linear polybutadiene having a 35% cis-1,4 content (Mooney viscosity=55).
[2] ASTM D-256-56.
[3] ASTM D-1238-57T.
[4] Additional styrene added just prior to suspension polymerization.
[5] One half of additional styrene added just prior to the suspension polymerization step, with the remainder added after 1 hour at 115° C.
[6] Equal amounts of additional styrene were added just prior to suspension, after heating 1 hour at 115° C., and after heating for 2 hours at 115° C.
[7] Includes 11 parts of alpha methyl styrene, that is, 45 parts styrene and 11 parts alpha methyl styrene.
[8] One incremental addition made just prior to suspension which consisted of 4/1 mixture of styrene to alpha methyl styrene.

The foregoing Table B demonstrates the preparation of the terpolymers of this invention employing 8 percent rubber. Several observations can be made: (a) where only one incremental addition was made, the polymers were slightly yellow, but still improved in kind over polymers prepared without the incremental addition technique of this invention (Runs A and D; compare with Run H); (b) the polymer of Run H made without provision for adjustment of the final overall styrene to acrylonitrile ratio (no incremental addition) was yellow in color. It should be pointed out here that with increasing rubber content of the polymer, there is a tendency of the polymer to be more yellow. (For example, using only 6 percent rubber in the runs of Table A and one incremental styrene addition, the polymer produced was white, while in Table B, using 8 percent rubber and one incremental addition resulted in a slightly yellow colored polymer.) (c) The polymer of Runs B, C, E and F were prepared using more than one incremental addition. All these polymers were white, thereby illustrating that more than incremental styrene addition is particularly desirable where higher amounts of rubber are used in the terpolymer preparation (see also Table C below where it is shown that more than one incremental styrene addition unexpectedly enhances the insolubility characteristics of these polymers in hydrocarbons). Of particular interest in Table B above is the illustration of terpolymers containing a final overall ratio of styrene to acrylonitrile of 67/33. These high acrylonitrile-containing polymers have outstanding solvent resistance to mineral acids, alkalies and hydrocarbons and are eminently suitable for application wherein these properties are particularly important. Polymers containing a styrene to acrylonitrile overall ratio of 60/40 can be readily prepared by the teachings of this invention. Run G illustrates the preparation of a polymer wherein part of the styrene is partially replaced by alpha methyl styrene. Incremental addition can be made using both of these monomers or singly with styrene.

All of the above data shows that the process of this invention leads to the preparation of highly desirable polymer products. This is particularly the case when the preferred method of incremental addition of styrene is employed in attaining a ratio of styrene to acrylonitrile within the preferred range of about 60/40 to 70/30. Not only do the terpolymer products have the outstanding properties listed in the above table, but they also have shown excellent resistance to such substances as gasoline, mineral oil, caustic, ammonium hydroxide, methanol and various mineral acids.

The following table shows the outstanding improvement in resistance to gasoline (solvent action) of terpolymers prepared by the incremental addition technique of this invention as compared to a terpolymer prepared without the incremental addition technique herein. This increased solvent resistance to gasoline resulted without impairing the known resistance of these polymers to inorganic acids, bases and salts.

TABLE C

| | Feed Monomer Ratio | No. of Styrene Increments | Adjusted Styrene/ Acrylonitrile Ratio | Percent Linear Polybutadiene Rubber [1] | Percent Gain in Weight [2] |
|---|---|---|---|---|---|
| Runs: | | | | | |
| A | 75/25 | 0 | | 8 | 29.9 |
| B | 75/25 | 0 | | 8 | 24.6 |
| C | 70/30 | 0 | | 8 | 21.1 |
| D | 56/44 | 1 | 70/30 | 6 | 16.2 |
| E | 56/44 | 2 | 70/30 | 6 | 1.4 |
| F | 56/44 | 3 | 70/30 | 8 | 4.8 |
| G | 50/50 | 1 | 70/30 | 6 | 18.0 |
| H | 56/44 | 1 | 67/33 | 8 | 9.7 |
| I | 56/44 | 2 | 67/33 | 8 | 1.2 |

[1] Linear Polybutadiene as in Tables A and B.
[2] ASTM D-543-60T.

This procedure was carried out with accurately weight compression molded discs two inches in diameter and 1/8 inch thick; the samples were suspended in a container of gasoline which was then sealed and stored for 7 days at 25° C. The samples were then removed and immediately wiped dry and reweighted to determine the weight percent increase.

The results illustrated in Runs E, F and I should be particularly noted. In these runs, the superior results of employing more than one incremental styrene addition, with respect to hydrocarbon solvent resistance, are particularly outstanding. This unexpected benefit contributes uniqueness to the process herein as will be readily apparent to those knowledgeable in this art.

In accordance with another feature of this invention, it was found that reduction in the concentration of the initiator employed in the suspension polymerization step from 0.2% to 1.0% resulted in an even further improvement in the color.

While particular embodiments of the invention are shown above, it will be understood that the invention is obviously subject to variations and modifications without departing from its broader aspects.

What is claimed is:

1. An improved process for preparing an interpolymer from acrylonitrile, a rubbery polymer of a conjugated diolefin and a monovinyl aromatic hydrocarbon compound which comprises:

(a) dissolving said conjugated diolefin rubber which is employed in an amount of from 4 to 15 weight percent by weight based on said interpolymer in a mixture of said monovinyl aromatic hydrocarbon compound and acrylonitrile within the range of about 40/60 to 60/40.

(b) prepolymerizing said mixture to a conversion of 10 to 45%, (c) adding during said prepolymerization an additional portion of said monovinyl aromatic compound, (d) suspending the prepolymerization reaction product in an aqueous medium, (e) adding during said suspension polymerization at least one other additional portion of said monovinyl aromatic compound, (f) polymerizing the mixture in suspension to substantial completion, and (g) recovering from said suspension an interpolymer containing an overall monovinyl aromatic compound to acrylonitrile weight ratio within the range of about 60/40 to 74/26 and having increased solvent resistance to hydrocarbons as compared with interpolymers prepared by processes without the incremental addition of said monovinyl aromatic compound of steps (c) and (e).

2. The process of claim 1 wherein two additional portions of monovinyl aromatic hydrocarbon are added during the suspension polymerization step.

3. The process of claim 1 wherein the rubbery polymer is linear polybutadiene.

4. The process of claim 1 wherein at least a minor amount of said monovinyl aromatic compound is substituted by alpha methyl styrene.

5. An improved process for preparing an interpolymer from acrylonitrile, styrene and a rubbery polymer of a conjugated diolefin which comprises essentially the steps of (a) dissolving the conjugated diolefin rubber component which is employed in amounts of from 4 to 15 weight percent in a mixture of styrene and acrylonitrile, said mixture containing an initial weight ratio of styrene to acrylonitrile within the range of about 40/60 to 60/40, (b) prepolymerizing said mixture with agitation to a conversion of about 15 to 30%, (c) adding during said prepolymerization additional styrene to the reaction product mixture, (d) suspending the reaction product mixture in an aqueous medium, (e) adding additional styrene to the reaction mixture during the suspension polymerization, (f) polymerizing the mixture in suspension to substantial completion and (g) recovering interpolymer from said suspension, said interpolymer containing an overall styrene to acrylonitrile weight ratio within the range of about 60/40 to 74/26.

6. The process of claim 5 wherein two incremental portions of styrene are added during the suspension polymerization.

References Cited

UNITED STATES PATENTS

| 3,268,625 | 8/1966 | Jones et al. | 260—880 |
| 3,278,642 | 10/1966 | Lee | 260—880 |
| 3,198,775 | 8/1965 | Delacretaz et al. | 260—85.5 |

GEORGE F. LESMES, *Primary Examiner.*

U.S. Cl. X.R.

260—4, 3.5, 33.6